United States Patent

Visca et al.

[11] Patent Number: 5,895,826
[45] Date of Patent: Apr. 20, 1999

[54] DIELECTRIC FLUIDS

[75] Inventors: Mario Visca, Alessandria; Ezio Strepparola, Treviglio, both of Italy

[73] Assignee: Ausimont, S.p.A., Milan, Italy

[21] Appl. No.: 08/921,800

[22] Filed: Sep. 2, 1997

[30] Foreign Application Priority Data

Sep. 4, 1996 [IT] Italy ................................ MI96A1820

[51] Int. Cl.$^6$ .................................................. B01D 15/00
[52] U.S. Cl. .............................. 570/179; 210/94; 568/582
[58] Field of Search ........................... 570/179; 210/96, 210/266, 282; 502/401, 416; 568/582

[56] References Cited

U.S. PATENT DOCUMENTS 5,462,908 10/1995 Laing.

FOREIGN PATENT DOCUMENTS 0 090 563 10/1983 European Pat. Off. .
0 457613 11/1991 European Pat. Off. .

OTHER PUBLICATIONS

Database WPI, Section ch, Derwent Publications Ltd., London, GB; Class E15, AN 73–08845U, XP 0022056029 & SU 339 536 A (Bildinov KN Ryzhkina LG T), 1993.

*Primary Examiner*—Shailendra Kumar
*Assistant Examiner*—Sreeni Padmanabhan
*Attorney, Agent, or Firm*—Nikaido Marmelstein Murray & Oram, LLP

[57] ABSTRACT

Use of amino derivatives supported on inert supports in fluorinated fluids utilized in devices subjected to high specific energies to reduce to levels lower than the toxicity limits the toxic decomposition products of said fluorinated fluids.

9 Claims, No Drawings

DIELECTRIC FLUIDS

The present invention relates to a process for reducing to levels lower than the toxic ones the toxic decomposition products sent in the atmosphere by the fluids used in devices subjected to high specific energies of both thermal, chemical, nuclear and electric type.

More specifically it relates to a process for the exhaustive reduction of toxic products deriving from the perfluorocarbene oligomerization, which is the initial decomposition product of the fluorinated fluids utilized in the applications specified below. In particular the present invention has as an object the reduction to levels under the tolerability threshold of perfluoroisobutene (PFIB), which is the most toxic olefin among those deriving from perfluorocarbene.

In particular the present invention relates to fluorinated fluids which are utilized as thermal or dielectric exchange fluids for instance in electric power transformers, in the cooling of power electronics, in the cooling of apparatus for generating high energy laser light or in the cooling of high speed computer components.

The employment of chlorofluorocarbons (CFC), such as for instance CFC 113 (1,2,2 trichloro-1,1,2 trifluoroethane), utilized in devices of thermal exchange is no longer allowed by the International rules owing to their high ODP.

The use of hydrocarbon based oils for the above mentioned applications shows several drawbacks, for instance the high inflammability of the materials and especially of the decomposition products and the high emission of volatile organic compounds.

In these kinds of application it is felt the need to have available liquid fluorinated fluids in a wide range of temperature having low toxicity, being not flammable and having also a low environmental impact of the gaseous emissions, in particular as regards the depletion of the ozone stratospheric layer (ODP) and a reduced greenhouse effect. (GWP: greenhouse warming potential)

The fluorinated fluids, such as perfluoroalkanes and perfluoropolyoxyalkanes, in particular those having high molecular weight and low volatility are considered the natural substituents of the fluids mentioned above due to the combination of the high performances with low environmental impact.

However these fluorinated fluids have the drawback to evolve toxic gases, in particular perfluoroisobutene (PFIB) when utilized in plants where they are subjected to the passage of high densities of chemical, nuclear, electric and thermal energy. From this point of view perfluoropolyoxyalkanes have superior characteristics compared with perfluorocarbons since the latter generate higher amounts of PFIB. In the mentioned applications, besides PFIB, also other olefins are generated such as tetrafluoroethylene (TFE), hexafluoropropene (HFP) and products such as carbonyl fluoride ($COF_2$), generator of hydrofluoric acid by contact with the atmospheric humidity.

The PFIB toxicity is higher than that of the other decomposition products wherefore it would be necessary to have available a lowering system to be able to utilize the fluorinated fluids mentioned in the indicated applications. Indeed, in the normal maintenance operations carried out in plants it is easy to exceed the dangerous dose for the operators' health. In particular the concentration of 100 ppb of gas in the atmosphere is considered the limit under which there are no irreversible defects on the human health for one hour exposures. Such limits are easily exceeded when the fluorinated fluids are subjected to high density energy typical of the operations described above.

It has been surprisingly and unexpectedly found by the Applicant that it is possible to reduce to levels lower than 1 ppb in liquid phase (see the method of analysis reported below), the PFIB concentration in the fluorinated fluids utilized in the applications indicated above.

It is therefore an object of the present invention the use of primary or secondary aliphatic or cycloaliphatic amino derivatives having low volatility, i.e. with vapour tension lower than or equal to 1 mm of Hg at 100° C., supported on inert supports with surface area generally of at least 1 $m^2/g$, in the fluorinated fluids utilized in the applications indicated above.

The supported amount of amino derivative can generally reach also values of 35% by weight, preferred 10–20% by weight, the minimum amount of amino derivative on the support being the effective one to obtain the scope of the invention, is generally in the range of 5% by weight. A test to establish the minimum amount is the one reported in the examples for tests of static type: the effectiveness is to be noticed in the PFIB decrease to the minimum values indicated above in the maximum time of three days.

As amines, primary and secondary amines having high basicity and low volatility are utilized. Preferably the radicals of the aliphatic, linear or branched, and/or (alkyl) cycloaliphatic, primary or secondary amines or polyamines contain preferably from 8 to 20 carbon atoms for the primary ones and from 5 to 20 carbon atoms for the secondary ones. Moreover amines having a polyoxyalkylene structure (polyoxyalkylenamines), monoamines, diamines, triamines with alkylenes such as ethylene, propylene, are utilized. The polyoxyalkylenamines are obtained from the corresponding polyoxyalkylenes-alcohols, -glycols or polyglycols through amination of the hydroxyl groups. The hydroxyl derivatives are obtained by oligomerization of ethylene or propylene oxide, optionally in admixture with each other, to give block or randomly distributed copolymer structures.

Polymers, such as for instance polyethylenes, polyacrylates, with primary or secondary amine functional groups grafted to the main chain can also be used; or said amino groups being present in the main chain, such as for instance in polyethyleneimines. Examples of polyethyleneimines are triethylentetramine and tetraethylenpentamine.

The supported amines can be employed in gaseous phase or immersed in the fluid. In the case of the use in gaseous phase it has been surprisingly found that the system is effective also on the PFIB present in liquid phase in short times. The system in gaseous phase can be utilized also during the equipment working. The system in liquid phase is preferably utilized in a filtering dynamic system external to the equipment in operating phase.

As supports, inorganic or organic supports with surface area larger than 1 $m^2/g$, preferably between 1–10 $m^2/g$, which are employed in liquid gas chromatography, can be utilized.

The preferred support must not be friable, must be inert from the chemical and chemical-physical points of view. The support basic matrix is formed by diatomite, thermally treated, milled and sieved to have the right granulometry (for instance Chromosorb 30–60 mesh); for more reactive materials such as silica preferably derivated to make them inert, for instance by silanisation.

It can also be used alumina commercially available in various granulometries (e.g. 8–14 mesh) with surface area 100–300 $m^2/g$.

Among the organic supports polytetrafluoroethylene is the most used, also fluorinated copolymers obtained by polymerization of fluorinated olefins can be utilized; the polymers obtained after granulation give porous materials having an almost spheric shape.

The amine is supported on the high surface area solid phase for instance Chromosorb® (diatomite having surface area from 1 to 4 m²/g) with the usual techniques in the preparation of the supports by chromatography. For example the support is suspended in the amine solvent; an amine solution is dropped under stirring in the same solvent in the prefixed amounts with respect to the support; always under stirring the solvent is evaporated under vacuum by leaving as residue the so charged support with the predetermined amount of amine.

The fluorinated fluids which are utilized for the applications of the present invention are (per)fluorooxyalkylenes or perfluoroalkanes, the latter, linear or branched or cyclic, optionally containing heteroatoms such as nitrogen and oxygen. The fluorinated fluids can also contain one or more hydrogen atoms in the end groups, e.g., of the type —$CF_2H$, —$CFHCF_3$, —$CF_2CF_2H$.

Said fluids are well known in the art and for the applications of the present invention. The (per)fluorooxyalkanes have weight average molecular weight generally comprised between 300 and 10000, preferably between 600 and 2000, more preferably 800–2000. The perfluoroalkanes have known molecular weight, are commercial products, for instance Fluorinert® such as for instance FC-72, FC-87, FC-84, perfluoro-N-ethylmorpholine, perfluoro-1,2-bis (trifluoromethyl) hexafluorocyclobutane. See U.S. Pat. No. 5,089,152 for the compounds of this kind.

The (per)fluorooxyalkanes comprise repeating units randomly distributed along the polymer chain selected from ($CF_2CF_2O$), (CFXO) wherein X is equal to F or $CF_3$, ($C_3F_6O$) ($CF_2(CF_2)_zO$) wherein z is an integer equal to 2 or 3, ($CF_2CF(OR_f)$ O), ($CF(OR_f)O$) wherein $R_f$ is equal to —$CF_3$, —$C_2F_5$, —$C_3F_7$.

The terminals of said perfluorooxyalkanes being selected from —$CF_3$, —$C_2F_5$, —$C_3F_7$, $ClCF_2CF(CF_3)$—, $CF_3CFClCF_2$—, $ClCF_2CF_2$—, $ClCF_2$—. Perfluoroalkyl terminals are preferred.

In particular the following perfluoropolyethers can be cited as preferred, which comprise the following repeating units randomly distributed along the polymer chain:

(a) —$(CF_2CF(CF_3)O)_a(CFXO)_b$—
wherein X is F or $CF_3$; a and b are numbers such that the molecular weight is comprised in the range indicated above; a/b is comprised between 10 and 100;

(b) —$(CF_2CF_2O)_c(CF_2O)_d(CF_2(CF_2)_zCF_2O)_h$—
wherein c, d and h are numbers such that the molecular weight is comprised in the range indicated above; c/d is comprised between 0.1 and 10; h/(c+d) is comprised between 0 and 0.05, z has the value indicated above;

(c) —$(CF_2CF(CF_3)O)_e(CF_2CF_2O)_f(CFXO)_g$—
wherein X is F or $CF_3$; e, f, g are numbers such that the molecular weight is comprised in the range indicated above; e/(f+g) is comprised between 0.1 and 10, f/g is comprised between 2 and 10;

(d) —$(CF_2O)_j(CF_2CF(OR_f)O)_k(CF(OR_f)O)_l$—
wherein: $R_f$ è —$CF_3$, —$C_2F_5$, —$C_3F_7$; j,k,l are numbers such that the molecular weight is comprised in the range indicated above; k+l and j+k+l are at least equal to 2, k/(j+l) is comprised between 0.01 and 1000, l/j is comprised between 0.01 and 100;

(e) —$(CF_2(CF_2)_zCF_2O)_s$—
wherein s is an integer such as to give the molecular weight indicated above, z has the meaning already defined;

(f) —$(CF(CF_3)CF_2O)_{j'}$— j" being an integer such as to give the molecular weight indicated above.

These compounds and the methods for preparing them are described in the patents GB 1,104,482, U.S. Pat. No. 3,242,218, U.S. Pat. No. 3,665,041, U.S. Pat. No. 3,715,378 and U.S. Pat. No. 3,665,041, EP 148,482 and U.S. Pat. No. 4,523,039, U.S. Pat. No. 5,144,092.

The preferred perfluoropolyethers of the present invention have the following chemical structure:

wherein the n"/m' ratio ranges from about 20 to about 40.

According to the present invention, as already said, perfluorooxyalkanes are preferred as fluorinated fluids, in comparison with perfluoroalkanes, since they produce lower amounts of PFIB during the indicated applications.

The analytical method for determining PFIB is the following:

ANALYSIS PFIB (UTILIZED IN THE EXAMPLES)

The quantitative analysis of the PFIB present in a solution of a perfluorinated solvent or in gaseous phase is carried out by gas-chromatography, in particular by a bidimensional gas-chromatography, i.e. on two columns, the former "of pre-separation" (25% ethylhexylsebacate on CHROMOSORB, 6×4 mm, 8 m), and the latter "analytical" (PORAPACK Q, 6×4 mm, 1.5 m) by using an electron capture detector. More in detail the sample is injected in the former column and 70% of the volume equivalent to the PFIB peak, at the suitable retention time, is automatically injected in the analytical column.

Injections are carried out of:

3 ml as gaseous phase

15 μl as liquid phase.

The detection limit is 0.1 ppb (volume); the external standard is of 5 ppb (vol.) in $N_2$.

The following examples are given for illustrative purposes and are not limitative of the present invention.

EXAMPLES

Methodology utilized

In 250 ml glass reactors equipped with two taps for sample taking in gaseous phase and liquid phase, 50 to 100 ml of solution to be treated are introduced. The reactants are kept or in gaseous phase or in liquid phase.

Example 1

In a reactor as described, 80 ml of a perfluoropolyalkylether such Galden® D05 (AUSIMONT) containing about 6000 ppb of PFIB are introduced.

In a small open container kept in gaseous phase are placed 3 g of a Chromosorb W 30–60 mesh charged with 30% of a trifunctional amine having polyoxypropylene structure $CH_3CH_2C(CH_2(OCH_2CH(CH_3))_2NH_2)_3$ in trade as Jeffamine® T403 by After 3 days the content in PFIB of the solution is analysed: PFIB=0.3 ppb.

Example 2

With the same techniques of Example 1 and with the only difference that the supported amine is kept in a glass wool sealed small envelope and kept in liquid phase, after 3 days the content in PFIB of the solution is analysed. It is <0.1 ppb.

Example 3 (comparative)

In the equipment and with the same modalities of Example 1 a bucket containing 3 g of a charge of 30% Sorbitolo on Chromosorb W 30–60 mesh is suspended in gaseous phase.

PFIB analysis on liquid phase (initial value about 6000 ppb) in the time:

| After 3 days | 6000 | ppb |
| After 9 days | 5900 | ppb |
| After 12 days | 5700 | ppb |
| After 15 days | 5400 | ppb |

Example 4 (comparative)

In the same equipment, with the same modalities, by using a PFIB solution in 600 ppm Galden of Example 1, cellulose is introduced a) in gaseous phase b) in liquid phase and then the content in PFIB in the solution is analysed during the time.

The results are the following:

a) from cellulose in gaseous phase:

| After 3 days | 5250 | ppb |
| After 9 days | 5200 | ppb |
| After 12 days | 4900 | ppb |
| After 15 days | 4450 | ppb | b) from cellulose in liquid phase:

| After 3 days | 5050 | ppb |
| After 9 days | 4750 | ppb |
| After 12 days | 4480 | ppb |
| After 15 days | 4130 | ppb |

We claim:

1. A method for reducing the toxic decomposition products of fluorinated fluids subjected to high energies comprising dispensing high molecular weight (polyamines) wherein said polyamines have polyoxyalkylene structure (polyoxyalkyleneamines) or polymer structure with primary or secondary amino functional groups present in the main chain, said amine derivatives having a vapour tension less than or equal to 1 mm of Hg at 100° C. and supported on inert supports with a surface area of at least 1 m$^2$/g in fluorinated fluids, by contacting said polyamines with gaseous phase of said fluorinated fluid or by immersing them in the liquid phase of the same fluorinated fluid to reduce the concentration of the most toxic decomposition product perfluoroisobutene (PFIB) in the liquid phase of said fluorinated fluid to levels lower than 1 ppb.

2. The method according to claim 1, wherein the supported amino derivative is present in amounts of up to 35% by weight.

3. The method according to claim 1, wherein the amino derivative is disposed in a gaseous phase or immersed in the fluid.

4. The method according to claim 1, wherein the support is selected from inorganic or organic supports having a surface area from 1 to 400 m$^2$/g utilized in liquid gas chromatography.

5. The method according to claim 4, wherein the support comprises diatomite, inert silica, alumina, polytetrafluoroethylene, or fluorinated copolymers obtained by polymerization of fluorinated olefins.

6. The method according to claim 1, wherein the fluorinated fluids are selected from the group consisting of (per)fluorooxyalkylenes and perfluoroalkanes, linear or branched or cyclic, optionally containing heteroatoms, such as nitrogen and oxygen; the perfluorinated fluids optionally contain hydrogen atoms in end groups.

7. The method according to claim 6, wherein the (per) fluorooxyalkanes have a weight average molecular weight comprised between 300 and 10000 and comprise repeating units randomly distributed along the chain of the polymer selected from the group consisting of:

($CF_2CF_2O$), ($CFXO$) wherein X is equal to F or $CF_3$, ($C_3F_6O$), ($CF_2(CF_2)_zO$) wherein z is an integer equal to 2 or 3, ($CF_2CF(OR_f O)$), ($CF(OR_f)O$) wherein $R_f$ is equal to —$CF_3$, —$C_2F_5$, —$C_3F_7$; the terminals of said perfluorooxyalkanes being selected from —$CF_3$, —$C_2F_5$, —$C_3F_7$, $ClCF_2CF(CF_3)$—, $CF_3CFClCF_2$—, $ClCF_2CF_2$—, $ClCF_2$—.

8. The method according to claim 7, wherein the (per) fluorooxyalkanes comprise the following repeating units randomly distributed along the polymer chain:

(a) —($CF_2CF(CF_3)O)_a(CFXO)_b$—wherein X is F or $CF_3$; a and b are numbers such that the molecular weight is comprised in the range indicated above; a/b is comprised between 10 and 100;

(b) —($CF_2CF_2O)_c(CF_2O)_d(CF_2(CF_2)_zCF_2O)_h$—wherein c, d and h are numbers such that the molecular weight is comprised in the range indicated above; c/d is comprised between 0.1 and 10; h/(c+d) is comprised between 0 and 0.05, z has the value indicated above;

(c) —($CF_2CF(CF_3)O)_e(CF_2CF_2O)_f(CFXO)_g$— wherein X is F or $CF_3$; e, f, g are numbers such that the molecular weight is comprised in the range indicated above; e/(f+g) is comprised between 0.1 and 10, f/g is comprised between 2 and 10;

(d) —($CF_2O)_j(CF_2CF(OR_f)O)_k(CF(OR_f)O)_l$—wherein: $R_f$ is —$CF_3$, —$C_2F_5$, —$C_3F_7$; j, k, and l are numbers such that the molecular weight is comprised in the range indicated above; k+l and j+k+l are at least equal to 2, k/(j+l) is comprised between 0.01 and 1000, l/j is comprised between 0.01 and 100;

(e) —($CF_2(CF_2)_zCF_2O)_s$—wherein s is an integer such as to give the molecular weight indicated above, z has the meaning already defined;

(f) —($CF(CF_3)CF_2O)_j$—j" being an integer such as to give the molecular weight indicated above.

9. The method according to claim 8, wherein the (per) fluorooxyalkanes have the structure:

wherein the n"/m' ratio ranges from about 20 to about 40.

* * * * *